United States Patent [19]

Mudge et al.

[11] Patent Number: 5,540,987

[45] Date of Patent: Jul. 30, 1996

[54] EMULSION BINDERS CONTAINING LOW RESIDUAL FORMALDEHYDE AND HAVING IMPROVED TENSILE STRENGTH

[75] Inventors: Paul R. Mudge, Belle Mead; James L. Walker, Whitehouse Station; Ronald Pangrazi, Flemington, all of N.J.

[73] Assignee: National Starch and Chemical Investment Holding Corporation, Wilmington, Del.

[21] Appl. No.: 314,556

[22] Filed: Sep. 28, 1994

Related U.S. Application Data

[63] Continuation of Ser. No. 971,432, Nov. 4, 1992, abandoned.

[51] Int. Cl.$^6$ .................... D04H 1/58; B32B 27/00
[52] U.S. Cl. .................... 428/288; 428/290; 526/330
[58] Field of Search .................... 428/288, 290; 526/330

[56] References Cited

U.S. PATENT DOCUMENTS

| | | | |
|---|---|---|---|
| 3,380,851 | 4/1968 | Lindemann et al. | |
| 3,708,388 | 1/1973 | Lindemann et al. | |
| 3,714,099 | 1/1973 | Biale. | |
| 4,449,978 | 5/1984 | Iacoviello | 428/290 |
| 4,647,611 | 3/1987 | Goldstein et al. | 524/458 |
| 4,745,025 | 5/1988 | Mao | 428/288 |
| 4,774,283 | 9/1988 | Goldstein et al. | 524/816 |
| 4,814,226 | 3/1989 | Goldstein | 428/288 |
| 5,026,765 | 6/1991 | Katz et al. | 524/561 |
| 5,087,676 | 2/1992 | Heider et al. | 526/93 |
| 5,180,772 | 1/1993 | Mao et al. | 524/816 |
| 5,373,045 | 12/1994 | Smith et al. | 524/385 |
| 5,412,019 | 5/1995 | Roulstone et al. | 524/847 |
| 5,415,926 | 5/1995 | Leighton et al. | 428/288 |

FOREIGN PATENT DOCUMENTS

| | | |
|---|---|---|
| 47-53348 | 5/1972 | Japan. |
| 56-45912A | 4/1981 | Japan. |
| 1447752 | 1/1974 | United Kingdom. |
| 1452465 | 4/1974 | United Kingdom. |

*Primary Examiner*—Terrel Morris
*Attorney, Agent, or Firm*—Ellen T. Dec

[57] ABSTRACT

The free formaldehyde content of the emulsion polymer, the amount of emitted formaldehyde and, even more particularly, of the finished nonwoven or textile may be substantially reduced by the use of a particular initiator system comprising a hydrophobic hydroperoxide and ascorbic acid. Moreover, this reduction in formaldehyde levels is accompanied by an unexpected improvement in the tensile properties of the emulsion binders.

9 Claims, No Drawings

EMULSION BINDERS CONTAINING LOW RESIDUAL FORMALDEHYDE AND HAVING IMPROVED TENSILE STRENGTH

This application is a continuation of application Ser. No. 07/971,432, filed Nov. 4, 1992 now abandoned.

Vinyl acetate based binders are used in a wide variety of nonwoven and textile applications. In nonwovens, vinyl acetate based binders are used to bind together a loosely assembled mass of fibers to form a self-sustaining web which can then be used to produce disposable diapers, consumer towels, disposable wipes, filtration products and the like. In textiles, they are used, for example, in fiberfill, upholstery backcoating, ticking coatings, flocking adhesives and high pile coatings. Depending upon the specific end use, the binders are formulated with other ingredients such as fillers, pigments, foaming agents, foam stabilizers, catalysts, thickeners and the like.

For many of these applications, it is desired to incorporate crosslinking monomers into the latex which, after application to the substrate, will crosslink in a weakly acid pH range or in the presence of latent acid catalysts at elevated temperatures in order to improve the durability of the textile or nonwoven.

N-methylol acrylamide has been the most widely used crosslinking monomer in such applications. However, N-methylol acrylamide is a recognized source of formaldehyde, a chemical the presence of which manufacturers are seeking to eliminate or reduce. Not only is formaldehyde generated by the N-methylol acrylamide component, it also results from many of the redox initiator systems typically used in the polymerization procedure. Thus, the polymerization is generally carried out using a two part redox initiator system which comprises an oxidizing agent such as t-butyl hydroperoxide, persulfates or hydrogen peroxide in combination with a reducing agent such as an alkali metal bisulfite or an alkali metal formaldehyde sulfoxylate.

The free formaldehyde resulting from the use of these emulsion binders can be quantified by three measurements. The first is the free formaldehyde in the emulsion polymer as used. The second measurement is the free formaldehyde emitted by the emulsion polymer upon impregnation or coating and drying and curing in the nonwoven or textile product. The third measurement is free formaldehyde present in the finished nonwoven or textile material. The formaldehyde level in the final product is especially important in binders and coatings which are to be in direct contact with human skin such as in the case of baby diapers, paper towels and the like. The measurement of formaldehyde emitted upon drying is important in the conversion of large fabric rolls where the levels of formaldehyde which may be released into the work environment are limited.

We have now found that the free formaldehyde content of the emulsion polymer, the amount of emitted formaldehyde and, even more particularly, of the finished nonwoven or textile may be substantially reduced by the use of a particular initiator system comprising a hydrophobic hydroperoxide and ascorbic acid. Moreover, this reduction in formaldehyde levels is accompanied by an unexpected improvement in the tensile properties of the emulsion binders.

Thus, the present invention is related to an improvement in the polymerization of vinyl acetate based emulsion polymers wherein the improvement comprises emulsion polymerizing vinyl acetate, a crosslinking monomer and any optional comonomers using a redox initiator system which comprises ascorbic acid and a hydrophobic hydroperoxide.

As used herein, the term "ascorbic acid" includes additionally the isomers of ascorbic acid such as iso-ascorbic acid (i.e., erythorbic acid). Hydrophobic hydroperoxides include, for example, tertiary butyl hydroperoxide, tertiary amyl hydroperoxide, cumene hydroperoxide and the like. Of the hydrophobic hydroperoxides, tertiary butyl is preferred.

We have found that the use of the hydrophobic hydroperoxide/ascorbic acid redox initiator system in preparing N-methylol acrylamide (NMA) crosslinked vinyl acetate-based emulsion polymers for use in nonwoven and textile applications results in these emulsion polymers imparting unexpectedly low levels of free formaldehyde to finished products relative to NMA-crosslinked vinyl acetate-based emulsion polymers prepared using previously disclosed redox initiator systems.

The primary monomer constituent used in the practice of this invention is vinyl acetate and the emulsions of this invention are derived from polymers containing at least 50% by weight of vinyl acetate. The vinyl acetate may be copolymerized with at least one of any conventionally employed comonomers. Suitable comonomers include those selected from the class of ethylene; vinyl chloride; vinyl esters of aliphatic carboxylic acids containing 1–20 carbon atoms; dialkyl esters of maleic and fumaric acid containing 1–8 carbon atoms in each alkyl group; and $C_1$–$C_8$ alkyl acrylates and methacrylates. These comonomers may be present in the emulsion copolymers at levels up to 48% by weight of the total polymer composition. In the case where ethylene is the comonomer, it is generally used in amounts up to about 30% by weight.

The crosslinking monomers used herein include N-methylol acrylamide, N-methylol methacryamide, N-methylol allyl carbamate, iso-butoxy methyl acrylamide and n-butoxy methyl acrylamide. The preferred crosslinking monomers are N-methylol acrylamide as well as a blend of N-methylol acrylamide and acrylamide available from American Cyanamid under the name NMA Special. The crosslinking monomer is generally used at levels of 0.5 to 10%, preferably 1 to 5% based upon the weight of the polymer.

The polymer may also contain up to 5% by weight acrylamide or methacrylamide.

Olefinically-unsaturated carboxylic acids may be used in an emulsion polymer. These include the alkanoic acids having from 3 to 6 carbon atoms or the alkenedioic acids having from 4 to 6 carbon atoms, like acrylic acid, methacrylic acid, crotonic acid, itaconic acid, maleic acid or fumaric acid, or mixtures thereof in amounts sufficient to provide up to about 4% by weight, of monomer units in the final copolymer.

Optionally, polyunsaturated copolymerizable monomers may also be present in small amounts, i.e., up to about 1% by weight. Such comonomers would include those polyolefinically-unsaturated monomers copolymerizable with vinyl acetate, for example, vinyl crotonate, allyl acrylate, allyl methacrylate, diallyl maleate, divinyl adipate, diallyl adipate, diallyl phthalate, ethylene glycol diacrylate, ethylene glycol dimethacrylate, butanediol dimethacrylate, methylene bis-acrylamide, triallyl cyanurate, etc. In addition, certain copolymerizable monomers which assist an the stability of the copolymer emulsion, e.g., sodium vinyl sulfonate, are also useful herein as latex stabilizer. These optionally present monomers, if employed, are added in very low amounts of from 0.1 to about 2% by weight of the monomer mixture.

The emulsions are prepared using conventional batch, semi-batch or semi-continuous emulsion polymerization procedures. Generally, the monomers are polymerized in an aqueous medium in the presence of the redox initiator system and at least one emulsifying agent.

If a batch process is used, the vinyl acetate and any optional non-functional monomers such as ethylene are suspended in water and are thoroughly agitated while being gradually heated to polymerization temperature. The homogenization period is followed by a polymerization period during which the initiator and functional monomers including N-methylol acrylamide are added incrementally or continuously. If the slow addition procedure is employed, the vinyl acetate and any optional comonomers are added gradually throughout the polymerization reaction. In either case, the polymerization is performed at conventional temperatures from about 70° to 225° F., preferably from 120° to 175° for sufficient time to achieve a low monomer content, e.g., from 0.5 to about 10 hours, preferably from 2 to about 6 hours, to produce a latex having less than 1 percent, preferably less than 0.2 weight percent, free monomer.

In the case of vinyl ester interpolymers containing ethylene, the polymerization procedure is similar to that discussed above except that it is carried out under pressure of 10 to about 130 atmospheres using polymerization procedures taught, for example, in U.S. Pat. Nos. 3,708,388; 3,404,112; 3,380,851 and 4,164,488. In these cases, the ethylene content of the interpolymer depends on the ethylene content of the aqueous polymerization medium. Factors which control the ethylene content of the polymerization medium include the partial pressure of ethylene in the vapor phase over the medium, the temperature of polymerization and the degree of mixing between the vapor phase and the liquid medium. Generally, the polymerization is performed at temperatures from 120° to 175° F. and, at these temperatures, ethylene partial pressures from 50 to 1,500, preferably from 250 to 1,000 psig, are sufficient to incorporate from 1 to 30, preferably from 5 to 25, weight percent ethylene in the polymer.

The particular polymerization initiator system used herein comprises a hydrophobic hydroperoxide, in amounts of between 0.05 and 3% by weight, preferably 0.1 and 1% by weight based on the total amount of the emulsion and ascorbic acid, in amounts of 0.05 to 3% by weight, preferably 0.1 to 1% by weight, based on the total amount of the emulsion. The redox initiator system is slow-added during the polymerization. A further treatment with similar amounts of the hydrophopbic hydroperoxide and the ascorbic acid can be carried out after completion of the polymerization in order to further reduce the residual vinyl acetate monomer.

To control the generation of free radicals, a transition metal often is incorporated into the redox system, and such metals include an iron salt, e.g., ferrous and ferric chloride and ferrous ammonium sulfate. The use of transition metals and levels of addition to form a redox system for polymerization mediums are well-known.

The polymerization is carried out at a pH of between 2 and 7, preferably between 3 and 5. In order to maintain the pH range, it may be useful to work in the presence of customary buffer systems, for example, in the presence of alkali metal acetates, alkali metal carbonates, alkali metal phosphates. Polymerization regulators, like mercaptans, chloroform, methylene chloride and trichloroethylene, can also be added in some cases.

The dispersing agents are all the emulsifiers generally used in emulsion polymerization, as well as optionally present protective colloids. It is also possible to use emulsifiers alone or in mixtures with protective colloids.

The emulsifiers can be anionic, cationic or nonionic surface active compounds. Suitable anionic emulsifiers are, for example, alkyl sulfonates, alkylaryl sulfonates, alkyl sulfates, sulfates of hydroxylalkanols, alkyl and alkylaryl disulfonates, sulfonated fatty acids, sulfates and phosphates of polyethoxylated alkanols and alkyphenols, as well as esters of sulfosuccinic acid. Suitable cationic emulsifiers are, for example, alkyl quaternary ammonium salts, and alkyl quaternary phosphonium salts. Examples of suitable nonionic emulsifiers are the addition products of 5 to 50 moles of ethylene oxide adducted to straight-chained and branch-chained alkanols with 6 to 22 carbon atoms, or alkylphenols, of higher fatty acids, or higher fatty acid amides, or primary and secondary higher alkyl amines; as well as block copolymers of propylene oxide with ethylene oxide and mixtures thereof. When combinations of emulsifying agents are used, it is advantageous to use a relatively hydrophobic emulsifying agent in combination with a relatively hydrophilic agent. The amount of emulsifying agent is generally from about 1 to 10, preferably from about 2 to about 8, weight percent of the monomers used in the polymerization.

The emulsifier used in the polymerization can also be added in its entirety to the initial charge to the polymerization zone or a portion of the emulsifier, e.g., from 25 to 90 percent thereof, can be added continuously or intermittently during polymerization.

Various protective colloids may also be used in addition to the emulsifiers described above. Suitable colloids include polyvinyl alcohol, partially acetylated polyvinyl alcohol, e.g., up to 50 percent acetylated, casein, hydroxyethyl starch, carboxymethyl cellulose, gum arabic, and the like, as known in the art of synthetic emulsion polymer technology. In general, these colloids are used at levels of 0.05 to 4% by weight, based on the total emulsion.

The polymerization reaction is generally continued until the residual vinyl acetate monomer content is below about 1%, preferably less than 0.2%. The completed reaction product is then allowed to cool to about room temperature, while sealed from the atmosphere.

The emulsions are produced and used at relatively high solids contents, e.g., between 35 to 70%, preferably not less than 50%, although they may be diluted with water if desired.

The particle size of the Latex can be regulated by the quantity of nonionic or anionic emulsifying agent or protective colloid employed. To obtain smaller particles sizes, greater amounts of emulsifying agents are used. As a general rule, the greater amount of the emulsifying agent employed, the smaller the average particle size.

The following examples are given to illustrate the present invention, but it will be understood that they are intended to be illustrative only and not limitative of the invention. In the examples, all parts are by weight unless otherwise indicated.

EXAMPLE I

This example describes the batch preparation of the emulsion polymers in accordance with the present invention.

A 10 liter stainless steel autoclave equipped with heating/ cooling means, variable rate stirrer and means of metering monomers and initiators was employed. To the 10 liter autoclave was charged 450 g (of a 20% w/w solution) sodium alkyl aryl polyethylene oxide sulphate (3 moles ethylene oxide), 60 g (of a 70% w/w solution in water) alkyl aryl polyethylene oxide (30 mole ethylene oxide), 70 g sodium vinyl sulfonate (25% solution in water), 0.5 g sodium acetate, 5 g (of a 1% solution in water) ferrous sulfate solution, 1.7 g ascorbic acid and 2000 g water. After purging with nitrogen, all the vinyl acetate (3600 g) was added and the reactor was pressurized to 600 psi with ethylene and equilibrated at 50° C. for 15 minutes.

The polymerization was started by metering in a solution of 16 g tertiary butyl hydroperoxide (tBHP) in 250 g of water and 10 g ascorbic acid in 250 g water. The initiators were added at a uniform rate Over a period of 5¼ hours.

Concurrently added with the initiators over a period of 4 hours was an aqueous solution of 280 g N-methylol acrylamide (48% w/w solution in water), 1.5 g of sodium acetate in 400 g of water.

During the reaction the temperature was controlled at 75° C. to 80° C. by means of jacket cooling. At the end of the reaction the emulsion was transferred to an evacuated vessel (30 L) to remove residual ethylene from the system. An additional 1.6 g of tBHP in 25 g water and 1 g ascorbic acid in 25 g water were added to reduce the residual monomer to less than 0.5%.

This procedure resulted in a polymeric composition of ethylene, vinyl acetate and N-methylol acrylamide (E/VA/NMA) in a 18:82:3 ratio (designated Sample 1).

Other samples, shown in Table I, were prepared as described above with the following variations:

Sample 2: 469 g NMA used in slow addition.

Sample 3: 469 g NMA Special (NMA Sp) added in slow addition. NMA Sp is a 47% solids solution of a blend of acrylamide and N-methylolacrylamide available from American Cyanamid Company.

Controls:

Sample 4: No NMA added.

Sample 5: No NMA added. Initiation system comprised 2 g sodium formaldehyde sulfoxylate (SFS) instead of ascorbic acid used in initial charge; with 25 grams tertiary butyl hydroperoxide and 20 more grams SFS added in slow add.

Sample 6: As in Sample 5, but 280 g NMA slow added.

Sample 7: As in Sample 5, but 469 g NMA slow added.

Sample 8: No NMA added. Initiation system comprised 2.7 g sodium metabisulfite (SMBS) instead of ascorbic acid in the initial charge; with 20 g SMBS and 15 g to tertiary butyl hydroperoxide in the slow add.

Sample 9: Same as Sample 8, but 280 g NMA slow added.

Sample 10: Same as Sample 8, but 469 g NMA added.

Sample 11: Same as Sample 9, but 469 g NMA Sp slow added.

The emulsion polymer compositions and physical characteristics are shown in Table I.

TABLE I

| SAMPLE | COMPOSITIONS | SOLIDS | pH | VISCOSITY | Tg |
|---|---|---|---|---|---|
| 1 | 18E/82VA/3NMA | 53.5 | 3.5 | 85 | +6° C. |
| 2 | 18E/82VA/5NMA | 53.3 | 3.7 | 1400 | +1° C. |
| 3 | 18E/82VA/5NMA Sp | 51.6 | 4.0 | 625 | +1° C. |
| 4 | 18E/82VA | 55.1 | 3.3 | 41 | +2° C. |
| 5 | 18E/82VA | 59.5 | 4.4 | 105 | +1° C. |
| 6 | 18E/82VA/3NMA | 56.8 | 4.5 | 57 | +2° C. |
| 7 | 18E/82VA/5NMA | 53.0 | 4.0 | 400 | 0° C. |
| 8 | 18E/82VA | 56.0 | 4.1 | 65 | +1° C. |
| 9 | 18E/82VA/3NMA | 55.3 | 4.1 | 1100 | +3° C. |
| 10 | 18E/82VA/5NMA | 54.8 | 4.1 | 1500 | +2.5° C. |
| 11 | 18E/82VA/5NMA Sp | 55.1 | 4.1 | 650 | −2° C. |

TEST PROCEDURE

In preparing the samples for testing, sections of a cellulosic pulp substrate were saturated using a Werner Mathis-type VFM Padder and a bath of 100 parts dry binder, 1 part catalyst and sufficient water to dilute to a 10% solids concentration, to a dry pick up of approximately 8 to 15 parts binder per 100 parts pulp web. The saturated web was dried for 1 minute at 100° C. in a laboratory contact drier and cured an additional 2 minutes at 149° C. in a forced air oven. The samples were conditioned overnight in a controlled temperature and humidity room.

The tensile tests were run on a standard Instron tensile tester set at 3 inch gauge length and 1 inch crosshead speed. The wet tensile strength was tested after soaking specimens for one minute in a 1.0% solution of Aerosol OT wetting agent. Results shown reflect the average of 10 tests.

In these examples, web formaldehyde is determined using an acetylacetone test procedure which utilizes the Nash reagent. The Nash reagent is a solution containing 0.2M acetylacetone, 0.05M acetic acid, and 2M ammonium acetate and has a pH of 6.6. Under the conditions of the assay method formaldehyde reacts with the reagent to produce a lutidine compound in a highly specific reaction.

The formaldehyde is extracted with deionized water. The colorimetric analysis is based on the reaction of formaldehyde with acetylacetone. The absorbency of the yellow-colored by-product is measured on a visible spectrophotometer at 412 nm and the concentration of free formaldehyde is determined with reference to a standard calibration curve.

The method for testing for free formaldehyde in the latex is done using a high performance liquid chromatography (HPLC) procedure which detects the derivatized formaldehyde. The procedure is highly selective to formaldehyde. Values are reported in parts per million (ppm) on the latex as made.

TABLE II

| SAMPLE | REDUCING AGENT | X-LINK MONOMER | HCHO IN LATEX | HCHO IN WEB | CMD TENSILE PERFORMANCE | | |
|---|---|---|---|---|---|---|---|
| | | | | | DRY | WET | M.E.K. |
| 1 | Asc. Acid | 3 NMA | 310 | 5 | 7.5 | 3.0 | 2.5 |
| 2 | Asc. Acid | 5 NMA | 500 | 8 | 8.2 | 3.5 | 2.8 |
| 3 | Asc. Acid | 5 NMA Special | 85 | 5 | 8.3 | 3.4 | 2.2 |
| 4 | Asc. Acid | — | 4 | 1 | N/T | N/T | N/T |
| 5 | SFS | — | 105 | 15 | N/T | N/T | N/T |
| 6 | SFS | 3 NMA | 530 | 21 | 7.5 | 2.3 | 1.5 |
| 7 | SFS | 5 NMA | 750 | 34 | 7.6 | 3.1 | 2.1 |
| 8 | SMBS | — | 5 | 2 | N/T | N/T | N/T |
| 9 | SMBS | 3 NMA | 300 | 17 | N/T | N/T | N/T |
| 10 | SMBS | 5 NMA | 490 | 30 | 6.0 | 2.2 | 1.3 |
| 11 | SMBS | 5 NMA Special | 80 | 13 | 6.6 | 2.5 | 1.3 |

As the results presented in Table II show, the level of formaldehyde in the dried web (less than 10 ppm) is substantially reduced in the samples prepared with the ascorbic acid initiated emulsions when compared with other emulsions containing comparable levels of NMA. Moreover, the samples prepared in accordance with the teachings of the present invention also exhibit substantial performance improvements as shown by the wet and dry tensile strength properties.

Formaldehyde emitted during the drying and curing of the emulsion polymers was also tested for the three different samples containing fives parts NMA. A one gram quantity of "as is" polymer is deposited onto a paper substrate that is suspended in a closed flask system enclosed in an oven at 190° C. As the binder dries and cures, the volatile emissions are trapped in a series of water traps which are then analyzed for formaldehyde concentration using the acetylacetone (Nash reagent) procedure outlined above. The 190° C. temperature was chosen to ensure thorough reaction of the N-methylolacrylamide crosslinking reaction. Analyzing several of the samples listed in Table I yielded the following results.

| SAMPLE TESTED | TOTAL FORMALDEHYDE GENERATED AFTER 60 MINUTES ppm |
|---|---|
| 2 | 1380 |
| 7 | 2760 |
| 10 | 1590 |

Again, the results show a substantial reduction in the level of emitted formaldehyde for sample 2 (prepared using the ascorbic acid containing initiator system) as opposed to sample 7 (SFS initiation). Although sample 10 does have reduced formaldehyde emitted, it is poorer than sample 2 in tensile strength performance and higher in web formaldehyde content (30 ppm vs 8 ppm) thus illustrating the uniqueness of the tBHP-ascorbic acid initiator system in reducing both emitted formaldheyde as well as residual web formaldehyde.

Samples 2 and 7 prepared using ascorbic acid and sodium formaldehyde sulfoxylate with 5 parts NMA were also tested in textile applications using the acetylacetone method of the Japanese Ministry of Health. In this test, formaldehyde is extracted from the web by heating in a water bath at 40° C. The extracted formaldehyde is reacted with buffered acetylacetone as described earlier.

The test was repeated for a textile ticking application on samples prepared using both saturation and foam coating techniques. The results are shown below.

| SAMPLE | METHOD | HCHO (ppm) |
|---|---|---|
| 2 | Saturation | 18 |
| 7 | Saturation | 46 |
| 2 | Foam Coating | 17 |
| 7 | Foam Coating | 31 |

The results presented in the previous examples illustrate the benefits of the present invention in ethylene vinyl acetate based, NMA crosslinked emulsion binders. Similar results will be observed using this particular initiator system to prepare crosslinking vinyl acetate homopolymers or other vinyl acetate based copolymers.

We claim:

1. A nonwoven product comprising a nonwoven web of fibers bonded together with a binder which comprises an emulsion polymer consisting of at least 50% by weight vinyl acetate; 0 to 48% by weight of a comonomer selected from the group consisting of vinyl chloride, vinyl esters of aliphatic carboxylic acids containing 1–20 carbon atoms, dialkyl esters of maleic and fumaric acid containing 1–8 carbon atoms in each alkyl group and C1–C8 alkyl acrylates and methacrylates; 0 to 30% by weight of ethylene; 0 to 4% by weight of an ethylenically unsaturated carboxylic acid; 0 to 1% by weight of a polyunsaturated copolymerizable monomer; 0 to 5% by weight acrylamide or methacrylamide; and a crosslinking monomer, said monomer present in an amount of from 0.5 to 10%; said monomer selected from the group consisting of N-methylol acrylamide, N-methylol methacrylamide, N-methylol allyl carbamate, iso-butoxy methyl acrylamide and n-butoxy methyl acrylamide, the emulsion polymer having been polymerized in a medium consisting essentially of water and a stabilizing system consisting of an emulsifier and/or polyvinyl alcohol using 0.05 to 3% by weight of a hydrophobic hydroperoxide and 0.05 to 3% by weight ascorbic acid as the initiator system, the nonwoven product exhibiting a low free formaldehyde content after drying and curing of less than 15 ppm; wherein the binder is present in an amount which is sufficient to bind the fibers together to form a self-sustaining web.

2. The nonwoven product of claim 1 in which the free formaldehyde content after drying and curing is less than 10 ppm.

3. The nonwoven product of claim 1 wherein the vinyl acetate is polymerized with up to 30% by weight ethylene.

4. The nonwoven product of claim 1 wherein the crosslinking monomer is N-methylol acrylamide.

5. The nonwoven product of claim 1 wherein there is additionally present in the emulsion polymer up to 5% by weight acrylamide or methacrylamide.

6. A textile product comprising a textile substrate coated with an emulsion polymer consisting of at least 50% by weight vinyl acetate: 0 to 48% by weight of a comonomer selected from the group consisting of vinyl chloride, vinyl esters of aliphatic carboxylic acids containing 1–20 carbon atoms dialkyl esters of maleic and fumaric acid containing 1–8 carbon atoms in each alkyl group and C1–C8 alkyl acrylates and methacrylates: 0 to 30% by weight of ethylene; 0 to 4% by weight of an ethylenically unsaturated carboxylic acid; 0 to 1% by weight of a polyunsaturated copolymerizable monomer; 0 to 5% by weight acrylamide or methacrylamide; and a crosslinking monomer, said monomer present in an amount of from 0.5 to 10% said monomer selected from the group consisting of N-methylol acrylamide, N-methylol methacrylamide, N-methylol allyl carbamate, isobutoxy methyl acrylamide and n-butoxy methyl acrylamide, the emulsion polymer having been polymerized in a medium consisting essentially of water and a stabilizing system consisting of an emulsifier and/or polyvinyl alcohol using 0.05 to 3% by weight of a hydrophobic hydroperoxide and 0.05 to 3% by weight ascorbic acid as the initiator system, the textile product having a free formaldehyde content after drying and curing of less than 15 ppm.

7. The textile product of claim 6 wherein the vinyl acetate is polymerized with up to 30% by weight ethylene.

8. The textile product of claim 6 wherein the crosslinking monomer is N-methylol acrylamide.

9. The textile product of claim 6 wherein there is additionally present in the emulsion polymer up to 5% by weight acrylamide or methacrylamide.

* * * * *